(12) United States Patent
Meinig et al.

(10) Patent No.: US 6,591,856 B1
(45) Date of Patent: Jul. 15, 2003

(54) SAFETY VALVE

(75) Inventors: Uwe Meinig, Weinheim (DE); Jörg Bittner, Weinheim-Hohensachsen (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/980,448

(22) PCT Filed: Apr. 20, 2000

(86) PCT No.: PCT/EP00/03603

§ 371 (c)(1),
(2), (4) Date: Oct. 31, 2001

(87) PCT Pub. No.: WO01/08917

PCT Pub. Date: Feb. 8, 2001

(30) Foreign Application Priority Data

Jul. 31, 1999 (DE) .................................. 199 36 161

(51) Int. Cl.[7] .............................................. F16K 24/04
(52) U.S. Cl. ........................................ 137/202; 137/587
(58) Field of Search ................................. 137/202, 587

(56) References Cited

U.S. PATENT DOCUMENTS 3,703,165 A * 11/1972 Hansen ..................... 137/202
4,082,106 A    4/1978  Butcher
4,562,855 A    1/1986  Cummings et al.
5,598,870 A *  2/1997  Nagino ..................... 137/202
5,680,848 A   10/1997  Katoh et al.
5,944,044 A *  8/1999  King et al. ............... 137/202

FOREIGN PATENT DOCUMENTS

DE          196 21 031         1/1997

* cited by examiner

Primary Examiner—Gerald A. Michalsky
(74) Attorney, Agent, or Firm—Kenyon & Kenyon

(57) ABSTRACT

A safety valve, such as for a refueling vent line between the tank filler neck and the active charcoal container in a motor vehicle. The safety valve is inserted into the refueling vent line being configured as a float valve. When fuel penetrates into the refueling vent line, and thereby into the safety valve, the outlet of the safety valve is closed by the float. The safety valve is provided with an anti-pollution pipe-end opening onto the environment and closed at normal pressure by a closure operated by a diaphragm. At an elevated pressure in the safety valve, the diaphragm effects an opening of the closure at the anti-pollution pipe-end.

12 Claims, 3 Drawing Sheets under extreme load limits, the mushroom diaphragm or its restrictor groove are designed to ensure that the volume displacement from the inner space takes place slowly, so that, even after a pressure drop in the safety valve, the inner space of the diaphragm has not yet been filled again with air, and the closure at the active charcoal pipe-end remains closed for a brief interval, so that the fuel can run off without hindrance through the anti-pollution pipe-end.

SAFETY VALVE

FIELD OF THE INVENTION

The present invention relates to a safety valve, and more particularly, to a safety valve for a refueling vent line.

BACKGROUND OF THE INVENTION

At gasoline stations, furnishing refueling lines with exhaust devices is known, for the purpose of returning gases produced during the filling operation, and so as not to let these gases reach the environment. However, this conventional approach is often not sufficient for completely avoiding environmental damage. Furthermore, there are also gasoline stations that do not currently employ comparable devices yet. Therefore, in various countries, for passenger motor vehicles having Otto engines, there are regulations that not only the hydrocarbons evaporating from the fuel tank during standstill and travel operation have to be separated in an active charcoal container, but also the hydrocarbon-containing gases displaced from the fuel tank. Therefore, in modern vehicles having tank venting systems, appropriate devices are built in. In this regard, the fuel tank is generally connected to the active charcoal container via an operating vent line, so that the gases escaping from the tank during driving operation and standstill during refueling are condensed in the active charcoal container.

In addition, a second refueling vent line, dimensioned substantially larger in cross section is conventionally provided, connecting the tank filler neck to the active charcoal container. During refueling, pushing the gas hose nozzle into the filler neck opens a flap, which allows the gases produced during refueling, and also those displaced from the tank by the inflowing fuel, to flow into the refueling vent line, and thereby into the active charcoal container. Typically, a seal is provided between the filler neck and the gas hose nozzle so that, during the refueling procedure, the gases cannot reach the atmosphere by going past the gas hose nozzle and by way of the filler neck.

However, in the design and arrangement of a conventional refueling vent line, it is possible that liquid fuel can reach the active charcoal container via the refueling vent line (e.g., during a malfunction of the gas hose nozzle, such as when the gas hose nozzle does not turn off when the tank is full, or when the tank is improperly overfilled). This entry of liquid fuel into the active charcoal container can cause a disturbance in gas mixture formation and possibly also cause damage to the catalytic converter.

SUMMARY OF THE INVENTION

The present invention relates to a safety valve, such as for a refueling vent line, between the tank filler neck and the active charcoal container in a motor vehicle, which prevents the entry of liquid fuel into an active charcoal container. According to the present invention, the safety valve set into the refueling vent line is configured as a float valve. When fuel penetrates into the refueling vent line, and thereby into the safety valve, the outlet of the safety valve is closed by the float. The safety valve is provided with an pipe-end closed by a closure opening out to the environment, operated at normal pressure by a diaphragm. At elevated pressure, the diaphragm effects an opening of the closure opening out on the environment at the anti-pollution pipe-end. When fuel penetrates into the safety valve, first the outlet of the valve to the active charcoal container is closed, and then the closure opening out to the environment is opened as a result of a pressure build-up in the valve, and the penetrating fuel can escape into the environment.

The float may pivot about an axis of rotation positioned laterally below the outlet, and is furnished with a linkage which activates a disk valve at the valve outlet. As soon as the float pivots about its axis, the disk valve is moved toward its valve seat and the outlet is closed. The disk valve itself may be guided by a guidance rail in the outlet pipe-end. The linkage may be configured in a very simple way from a bolt connected to the disk valve and a sliding connecting link, enclosing the bolt, connected to the float. The float may be held at its limit positions by a spring. This prevents the float from opening the disk valve too soon. Opening of the disk valve first may take place when, due to the outflow of the fuel, the lift of the float has sunk below a settable value.

The closure of the anti-pollution pipe-end is formed by a disk valve having a spring force exerted on it, which is actuated by the diaphragm in the valve body via a linkage. The diaphragm operates as a function of the pressure present in the valve. The closing of the outlet to the active charcoal container causes a pressure buildup in the valve. This pressure acts on the diaphragm, which opens the environmental valve using a lever linkage in opposition to the force of the closing spring.

Relatively rapid pressure equalization between the valve outlet of the safety valve and the upper side of the diaphragm enable, in the case of refueling, the loss in flow pressure of the line between the safety valve and the active charcoal container and the throttling losses in the active charcoal container, from causing a premature opening of the closure at the anti-pollution pipe-end. For this reason, the upper side of the diaphragm is covered by a lid, and the inner space formed thereby between diaphragm and lid is connected by the valve pipe-end to the active charcoal container via a channel. As long as the pipe-end of the outlet to the active charcoal container is not closed, the pressure in the valve housing is transferred to the upper side of the diaphragm via the channel, so that the same pressure exists on the upper and lower sides of the diaphragm. In this case, the environmental valve opens only at a pressure in the valve chamber at which the force of the pressure on the environmental valve body exceeds the force of the closing spring of the environmental valve. For this, the channel opening at the outlet can be fitted into the sealing seat of the disk valve, so that the outlet as well as the channel are closed by the disk valve.

The diaphragm may be equipped with a damping function to ensure that the fuel present in the line from the tank filler neck to the valve and in the valve runs off via the anti-pollution pipe-end after the flooding of the valve with fuel and the opening of the closure at the anti-pollution pipe-end. For this purpose, an intermediate wall having a check valve, e.g. a mushroom diaphragm, is fitted into the inner space of the diaphragm, and the side space formed by the lid and the intermediate wall is connected to the outlet via a side channel, the sealing surface of the mushroom diaphragm being provided with at least one restrictor groove. Instead of the restrictor groove, the diaphragm may alternatively be outfitted with a specified roughness or porosity.

When pressure is applied to the diaphragm, the air volume of the inner space is displaced by the lifting-off surface of the mushroom diaphragm toward the active charcoal container pipe-end. After the opening of the valve at the anti-pollution pipe-end, a pressure decrease takes place in the safety valve, and fuel flows into the surroundings. In order to achieve a complete emptying of the safety valve and the line from the direction of the filler neck, access of air to the space above the diaphragm is delayed by the restrictor groove or a specified roughness in the contact surface of the check diaphragm or an opposite surface, so that the environmental valve closes again only after a time delay.

Advantageously, the valve housing is configured as a sunken portion in the region of the closure, in order to prevent the gas present in the safety valve from flowing out and possibly fuel remaining therein, when the anti-pollution pipe-end is opened. The use of the sunken portion prevents the gas from escaping unless the fuel level has sunk below the level of a housing edge positioned above it.

DETAILED DESCRIPTION

Figure 1:
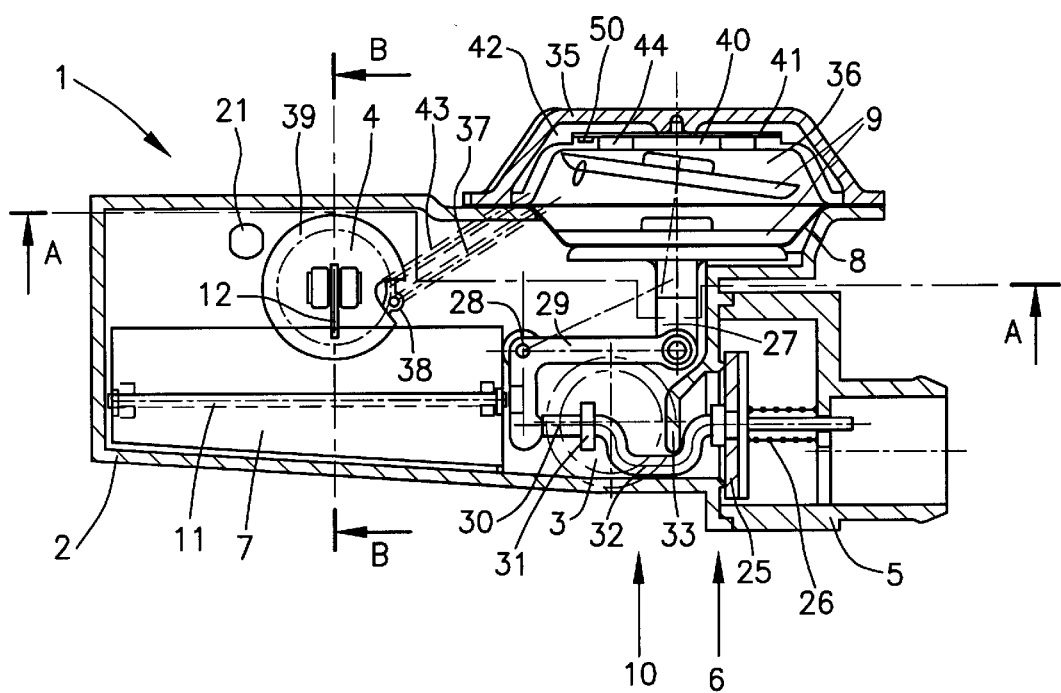
FIG. 1 illustrates a longitudinal section through the safety valve, according to the present invention.

Safety valve 1 includes a housing 2 having inlet 3 and outlet 4 as well as anti-pollution pipe-end 5. The gases coming from the filler neck at the tank are conducted to inlet 3 on valve 1 by the refueling vent line, and reach the line section to the active charcoal container via outlet 4. Outlet 4 of safety valve 1 can be closed, and so can anti-pollution pipe-end 5, which, under normal conditions, is constantly closed by closure 6. Under normal conditions, outlet 4 is constantly open. It can be closed by float 7 when fuel penetrates into safety valve 1. However, the penetrating fuel not only has the effect of closing outlet 4 via float 7, but also of raising the pressure in safety valve 1. The increased pressure causes an upward movement of diaphragm 8, so that diaphragm disk 9 together with diaphragm 8 goes from its lower position to the indicated upper position. Diaphragm 8 is connected to a linkage 10 by which the opening of closure 6 is achieved.

Figure 2:
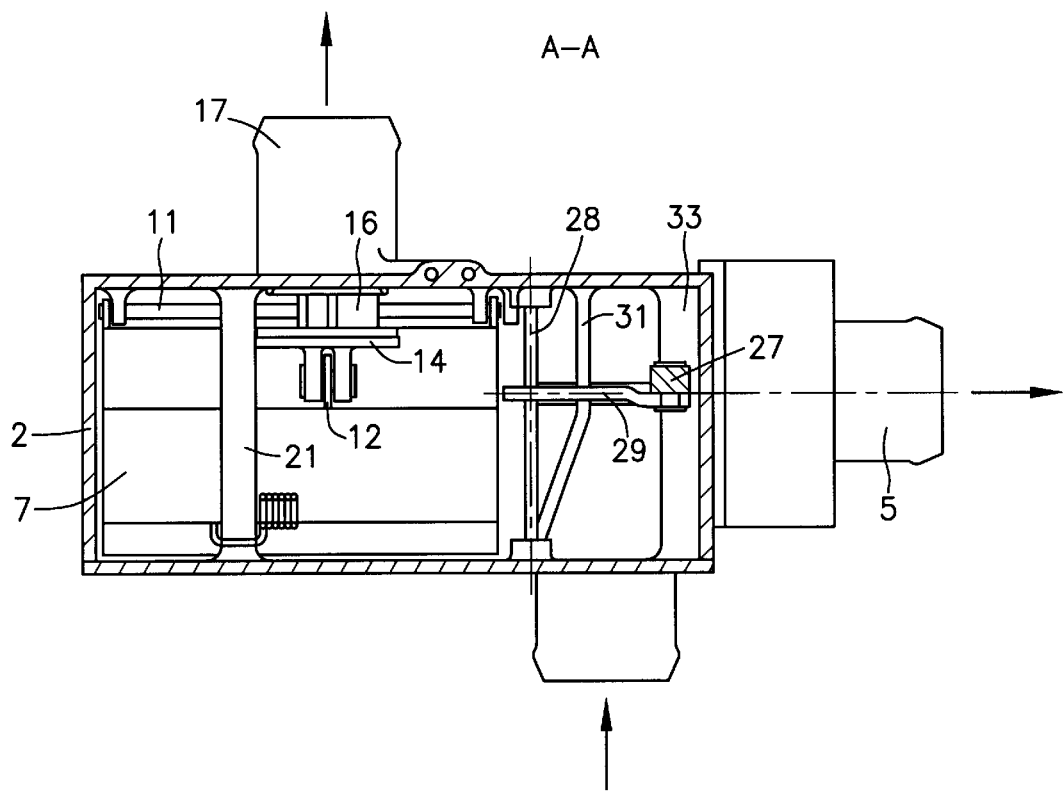
FIG. 2 illustrates a section along line A—A in FIG. 1 through the safety valve, according to the present invention.
Figure 3:
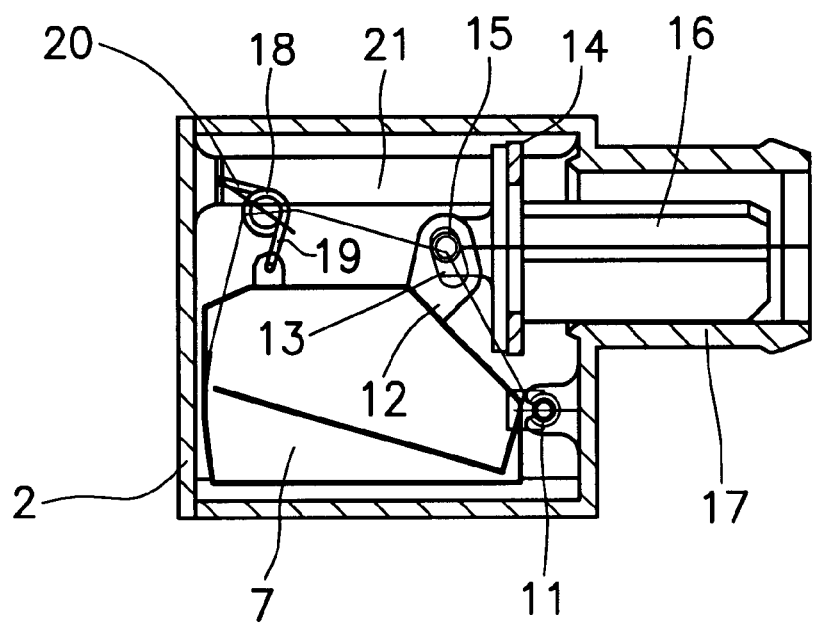
FIG. 3 a section along line B—B in FIG. 1, according to the present invention.

When fuel penetrates into safety valve 1 via inlet 3, float 7 pivots on an axis of rotation 11 arranged laterally underneath outlet 4 (see also FIGS. 2 and 3 on this). A sliding linkage 12 is mounted at the float, which, with its connecting link slot 13, encloses a bolt 15 mounted on a disk valve 14 which closes outlet 4. Disk valve 14 is guided on a three-legged guide rail 16 in outlet pipe-end 17. Float 7 is provided with a bistable spring 18 whose one leg 19 is fastened to float 7, while the other leg 20 engages with cross beam 21.

Closure 6 is also configured as a disk valve 25, and is pressed to the valve seat by spring 26. Diaphragm disk 9 is provided with rod 27, whose end engages articulatedly with angle lever 29 which is pivotable about axis 28. Angle lever 29 activates impacting rod 30 of disk valve 25. Impacting rod 30 is guided in cross beam 31. Impacting rod 30 is provided with a right-angle bend 32 which is guided through under wall 33. Wall 33 is used as a gas barrier wall so that gases can reach anti-pollution pipe-end 5 only when the liquid level has sunk to below the lower edge of barrier wall 33. This is further supported by the sunken portion-shaped development of the entire housing 2, in which, in the region of closure 6, the housing is designed with the lowest point as a sunken portion.

Diaphragm 8 is covered by lid 35. Inner space 36, which was created between lid 35 and diaphragm 8, is connected to outlet 4 via channel 37. Channel opening 38, outlet 4 and sealing seat 39 of the disk valve seat are configured such that disk valve 14 may operate to close outlet 4 as well as channel 37. This prevents closure 6 from being prematurely closed before outlet 4 is opened.

In an alternative embodiment, the linkage may have some play, enabling it to operate with a delay. In this embodiment, channel 37 may be omitted and side channel 43 may be sufficient. The characteristic stiffness of diaphragm 8 may be sufficient as the opposing pressure to press back the linkage and to close the environmental valve.

During closing of closure 6 of anti-pollution pipe-end 5, additional damping is achieved by fitting an intermediate wall 40 into inner space 36, between diaphragm 8 and lid 35, which has a mushroom diaphragm 41. Then there is formed a subsidiary space 42 with mushroom diaphragm 41 between lid 35 and intermediate wall 40. This subsidiary space 42 is connected to outlet pipe-end 17 via subsidiary channel 43. The sealing surface of mushroom diaphragm 41, which lies adjacent to intermediate wall 40, is provided with at least one restrictor groove 50, through which gas from pipe-end 17 can flow into inner space 36 in a delayed manner. Thus, mushroom diaphragm 41 effects a rapid exit of the gases from space 36 via openings 44 in intermediate wall 40 into subsidiary space 42, and from there through channel 43 into pipe-end 17. Whereas, in the other direction the flowing in of the gases via channel 43, subsidiary space 42 and the restrictor grooves are substantially delayed at the sealing surface of mushroom diaphragm 41.

Let it still be noted that diaphragm 8 begins to be effective employed when valve 6 is closed. When outlet 5 is open, the safety valve acts as a direct overflow valve.

What is claimed is:

1. A safety valve for a refueling vent line between a tank filler neck and an active charcoal container in a motor vehicle, the safety valve having a float, such that when a fuel penetrates into the safety valve, an outlet of the safety valve is closed by the float, the safety valve being provided with an anti-pollution pipe-end opening into the environment and closed at normal pressure by a closure operated by a diaphragm, the diaphragm configured to effect an opening of the closure at the anti-pollution pipe-end in response to an elevated pressure in the safety valve.

2. The safety valve as recited in claim 1, wherein the float pivots about an axis of rotation arranged laterally underneath the outlet and is provided with a linkage which activates a disk valve at the valve outlet.

3. The safety valve as recited in claim 2, wherein the disk valve is guided in a pipe-end of the valve outlet by a guide rail.

4. The safety valve as recited in claim 2, wherein the linkage has an area of play.

5. The safety valve as recited in claim 2, wherein a channel opening of a channel at the outlet is fitted into the sealing seat of the disk valve seat, so that both the outlet and the channel are closeable by the disk valve.

6. The safety valve as recited in claim 1, wherein the closure at the anti-pollution pipe-end includes a disk valve having a spring force acting upon it.

7. The safety valve as recited in claim 1, wherein an upper side of the diaphragm is covered by a lid and an inner space formed thereby between the diaphragm and the lid is connected to the outlet of the safety valve by a channel.

8. The safety valve as recited in claim 7, wherein an intermediate wall having a check valve is fitted into an inner space between the diaphragm and the lid, and a side space formed by the lid and the intermediate wall is connected to the outlet pipe-end by a side channel, a sealing surface of an intermediate wall being provided with at least one restrictor groove.

9. The safety valve as recited in claim 1, further comprising a valve housing, wherein the valve housing is formed as a sunken portion in the region of the closure on the anti-pollution pipe-end.

10. The safety valve as recited in claim 9, wherein a gas-blocking wall is provided above the sunken portion.

11. A safety valve for a refueling vent line between a tank filler neck and an active charcoal container in a motor vehicle, the safety valve having a float, such that when a fuel penetrates into the safety valve, an outlet of the safety valve is closed by the float, the safety valve being provided with an anti-pollution pipe-end opening into the environment and closed at normal pressure by a closure operated by a diaphragm, the diaphragm configured to effect an opening of the closure at the anti-pollution pipe-end in response to an elevated pressure in the safety valve, wherein the float pivots about an axis of rotation arranged laterally underneath the outlet and is provided with a linkage which activates a disk valve at the valve outlet, and wherein the linkage includes a bolt connected to the disk valve and a sliding connecting link connected to the float and enclosing the bolt.

12. A safety valve for a refueling vent line between a tank filler neck and an active charcoal container in a motor vehicle, the safety valve having a float, such that when a fuel penetrates into the safety valve, an outlet of the safety valve is closed by the float, the safety valve being provided with an anti-pollution pipe-end opening into the environment and closed at normal pressure by a closure operated by a diaphragm, the diaphragm configured to effect an opening of the closure at the anti-pollution pipe-end in response to an elevated pressure in the safety valve, wherein the float has limit positions and is held in its limit positions by a bistable spring.

* * * * *